United States Patent
Choi et al.

(10) Patent No.: US 9,648,236 B2
(45) Date of Patent: May 9, 2017

(54) DEVICE WITH A FRONT FACING CAMERA HAVING DISCRETE FOCUS POSITIONS

(71) Applicant: BLACKBERRY LIMITED, Waterloo (CA)

(72) Inventors: Yun Seok Choi, Waterloo (CA); Sui Tong Tang, Waterloo (CA); Thomas Guillaume Grandin, Kitchener (CA); Arnett Ryan Weber, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 12 days.

(21) Appl. No.: 14/625,737

(22) Filed: Feb. 19, 2015

(65) Prior Publication Data

US 2016/0248975 A1    Aug. 25, 2016

(51) Int. Cl.
*H04N 5/232* (2006.01)
*G03B 13/36* (2006.01)
*H04N 5/225* (2006.01)

(52) U.S. Cl.
CPC ......... *H04N 5/23245* (2013.01); *G03B 13/36* (2013.01); *H04N 5/2252* (2013.01); *H04N 5/23212* (2013.01); *H04N 5/23219* (2013.01); *H04N 5/23293* (2013.01)

(58) Field of Classification Search
USPC ..................................................... 348/220.1
See application file for complete search history.

(56) References Cited

U.S. PATENT DOCUMENTS

| 8,929,538 B2 * | 1/2015 | Liu | H04M 1/605 379/433.02 |
| 2006/0029379 A1 * | 2/2006 | Butterworth | G03B 13/32 396/89 |
| 2009/0141141 A1 | 6/2009 | Onozawa | |
| 2011/0141339 A1 * | 6/2011 | Seo | G02B 15/177 348/344 |
| 2012/0127360 A1 | 5/2012 | Devaux et al. | |

(Continued)

OTHER PUBLICATIONS iOcrean X8—http://www.androidheadlines.com/2014/05/iocean-x8-comes-5mp-auto-focus-front-camera-clear-self-portraits.html, dated May 30, 2014.

(Continued)

*Primary Examiner* — Roberto Velez
*Assistant Examiner* — Cynthia Segura
(74) *Attorney, Agent, or Firm* — Perry + Currier, Inc.

(57) ABSTRACT

A device with a front facing camera having two discrete focus positions is provided. The device comprises: a chassis comprising a front side; a display and a camera each at least partially located on the front side; the camera adjacent the display, the camera facing in a same direction as the display, the camera configured to: acquire video in a video mode; acquire an image in a camera mode; and, discretely step between a first and second focus position, the first position comprising a depth of field ("DOF") at a hyperfocal distance and the second position comprising a DOF in a range of about 20 cm to about 1 meter; and, a processor configured to: when the camera is in the camera mode, automatically control the camera to the first position; and, when the camera is in the video mode, automatically control the camera to the second position.

15 Claims, 10 Drawing Sheets

(56) References Cited

U.S. PATENT DOCUMENTS

| | | | |
|---|---|---|---|
| 2013/0033418 A1* | 2/2013 | Bevilacqua | G06F 3/017 345/156 |
| 2013/0222514 A1* | 8/2013 | Liu | H04M 1/605 348/14.01 |
| 2013/0329106 A1* | 12/2013 | Bigioi | G03B 3/10 348/308 |
| 2014/0176663 A1 | 6/2014 | Cutler et al. | |
| 2015/0189178 A1* | 7/2015 | Lombardi | H04N 5/232 348/207.99 |
| 2016/0134803 A1* | 5/2016 | Deng | H04N 5/23219 348/222.1 |

OTHER PUBLICATIONS

HTC Desire Eye—o http://www.theguardian.com/technology/2014/oct/09/htc-selfie-camera-phone-desire-eye, Dated Oct 9, 2014.
Extended European Search Report dated Oct. 18, 2016 for European Patent Applicaton No. 16155200.5.

* cited by examiner

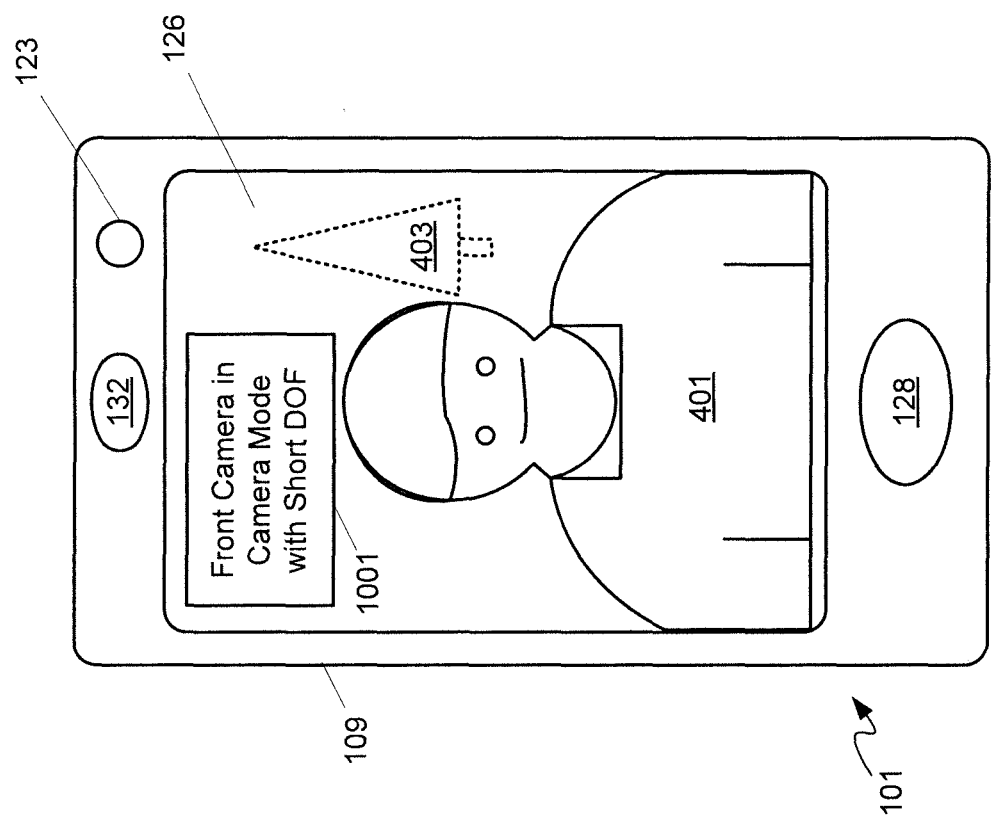

DEVICE WITH A FRONT FACING CAMERA HAVING DISCRETE FOCUS POSITIONS

FIELD

The specification relates generally to mobile devices with front facing cameras, and specifically to a device with a front facing camera having two discrete focus positions.

BACKGROUND

Front facing cameras (FFC) in mobile handsets and/or mobile devices are generally fixed focus cameras which are not able to cover an entire range of object distances. FFCs have often been used for video chatting; however they are increasingly being used for self-portraits and/or landscapes as well. In these cases, fixed focus cameras are not able to achieve a good focus quality on both faces and objects at the same time due to a limited DOF (Depth Of Field). Given the relatively tiny size of FFC modules, a pixel size of image sensors of FFC tending towards getting smaller, hence larger apertures (and/or smaller F-numbers) are required for better low light performances. However, a small F-number on optics makes DOF shorter. In other words, cameras with a small F-number generally requires an auto-focus feature which, relative to a fixed focus camera, increases cost, power consumption and process flow complexity at least due to auto-focus mechanisms and calibrations.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 10 depicts an image acquired with a DOF between 20 cm and 1 meter in a camera mode, according to non-limiting implementations.

DETAILED DESCRIPTION

Figure 1:
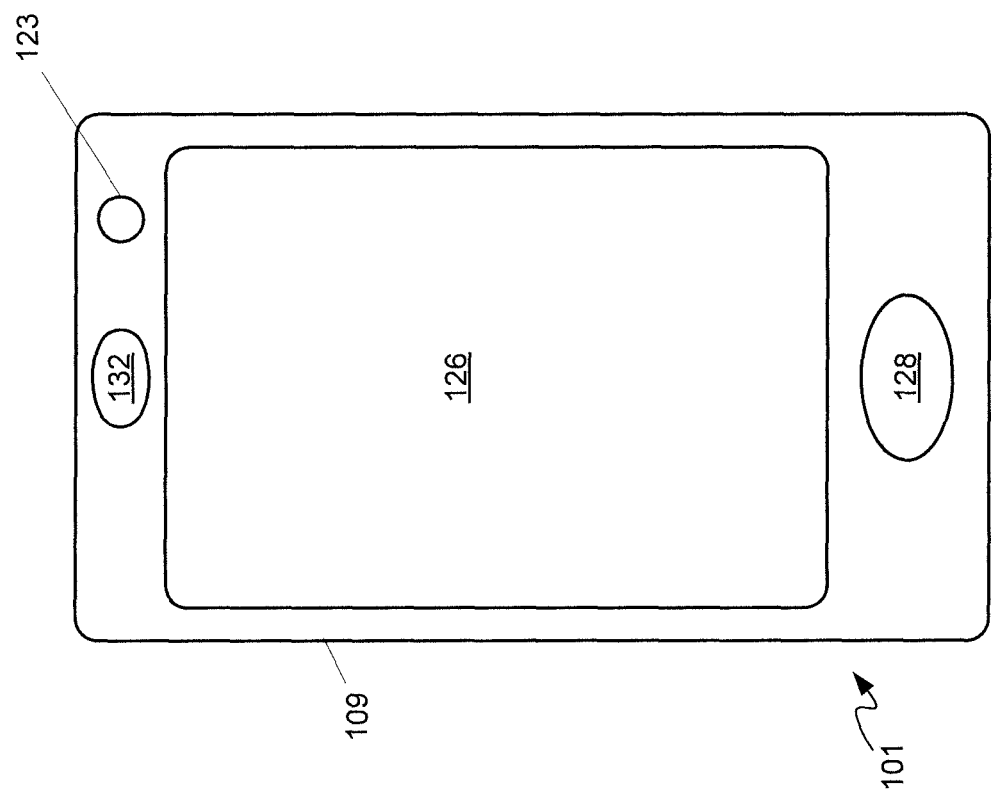
FIG. 1 depicts a device configured for changing communications of an audio port between an applications processor and an audio processor, according to non-limiting implementations.

In general, this disclosure is directed to a device, and in particular a mobile device, which comprises a front facing camera (FFC) having two discrete focus positions: a first focus position at a hyperfocal distance; and, a second focus position between about 20 cm and about 1 meter, which can correspond to about an arm length of a user. The FFC is controlled to be in first focus position when the FFC is being used in a camera mode to acquire images, for example during acquisition of self-portraits, also colloquially known as "selfies". The FFC is controlled to be in second focus position when the FFC is being used in a video mode to acquire video, for example during video chatting. Each of the focus positions are discrete positions in that the FFC does not operate in an auto-focus mode, nor is the FFC enabled for auto-focus, nor is the FFC an auto-focus camera device. For example, as the focus positions are discrete, the FFC can be configured to acquire images and/or video only at these two focus positions (though in some implementations the FFC can include a third focus position, for example between the first focus position and the second focus position, or shorter than the second focus position (e.g. in a macro mode)). A processor of the device can control the FFC between positions based on a mode of the FFC. Hence, when the camera device is in a camera mode, the processor automatically controls the camera device to the first focus position so that images and/or selfies at a hyperfocal distance can be acquired; and, when the camera device is in a video mode, the processor automatically controls the camera device to the second focus position so that the FFC shows a user in focus, with a blurred background, for example for video chatting.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a device comprising: a chassis comprising a front side and a back side; a display device located on the front side of the chassis; a camera device at least partially located on the front side of the chassis adjacent the display device, the camera device facing in a same direction as the display device, the camera device configured to: acquire video in a video mode; acquire an image in a camera mode, the camera device being in one of the video mode or the camera mode at any given time; and, discretely step between a first focus position and a second focus position, the first focus position comprising a depth of field ("DOF") at a hyperfocal distance and the second focus position comprising a DOF in a range of about 20 cm to about 1 meter; and, a processor configured to: when the camera device is in the camera mode, automatically control the camera device to the first focus position; and, when the camera device is in the video mode, automatically control the camera device to the second focus position.

The processor can be further configured to control the camera device to be in one of the video mode or the camera mode based on a determined distance between the device and a face in a field of view of the camera device. The device can further comprise a proximity detector configured to determine a distance between the device and the face in a field of view of the camera device.

Each of the first focus position and the second focus position can be discrete focus positions of the camera device.

The camera device can be configured to step only between the first focus position and the second focus position.

There can be no further focus positions of the camera device other than the first focus position and the second focus position.

The camera device can be configured to discretely step between the first focus position, the second focus position and a third focus position.

The video mode can correspond to a video chat mode and the camera mode can correspond to a selfie mode.

The device can further comprise an input device, the processor further configured to: control the camera device to the first focus position or the second focus position based on input data received at the input device.

Another aspect of the specification provides a method comprising: at a device comprising: a chassis comprising a front side and a back side; a display device located on the front side of the chassis; a camera device at least partially located on the front side of the chassis adjacent the display device, the camera device facing in a same direction as the display device, the camera device configured to: acquire video in a video mode; acquire an image in a camera mode, the camera device being in one of the video mode or the camera mode at any given time; and, discretely step between a first focus position and a second focus position, the first focus position comprising a depth of field ("DOF") at a hyperfocal distance and the second focus position comprising a DOF in a range of about 20 cm to about 1 meter; and, a processor: when the camera device is in the camera mode, automatically controlling, using the camera device, the camera device to the first focus position; and, when the camera device is in the video mode, automatically controlling, using the camera device, the camera device to the second focus position.

The method can further comprise controlling the camera device to be in one of the video mode or the camera mode based on a determined distance between the device and a face in a field of view of the camera device. The device can further comprise a proximity detector configured to determine a distance between the device and the face in a field of view of the camera device.

Each of the first focus position and the second focus position can be discrete focus positions of the camera device.

The camera device can be configured to step only between the first focus position and the second focus position.

There can be no further focus positions of the camera device other than the first focus position and the second focus position.

The camera device can be configured to discretely step between the first focus position, the second focus position and a third focus position.

The video mode can correspond to a video chat mode and the camera mode can correspond to a selfie mode.

The device can further comprise an input device, and the method can further comprise: controlling the camera device to the first focus position or the second focus position based on input data received at the input device.

Yet another aspect of the specification provides a computer-readable medium storing a computer program, wherein execution of the computer program is for: at a device comprising: a chassis comprising a front side and a back side; a display device located on the front side of the chassis; a camera device at least partially located on the front side of the chassis adjacent the display device, the camera device facing in a same direction as the display device the camera device configured to: acquire video in a video mode; acquire an image in a camera mode, the camera device being in one of the video mode or the camera mode at any given time; and, discretely step between a first focus position and a second focus position, the first focus position comprising a depth of field ("DOF") at a hyperfocal distance and the second focus position comprising a DOF in a range of about 20 cm to about 1 meter; and, a processor: when the camera device is in the camera mode, automatically controlling, using the camera device, the camera device to the first focus position; and, when the camera device is in the video mode, automatically controlling, using the camera device, the camera device to the second focus position. The computer-readable medium can comprise a non-transitory computer-readable medium.

Figure 2:
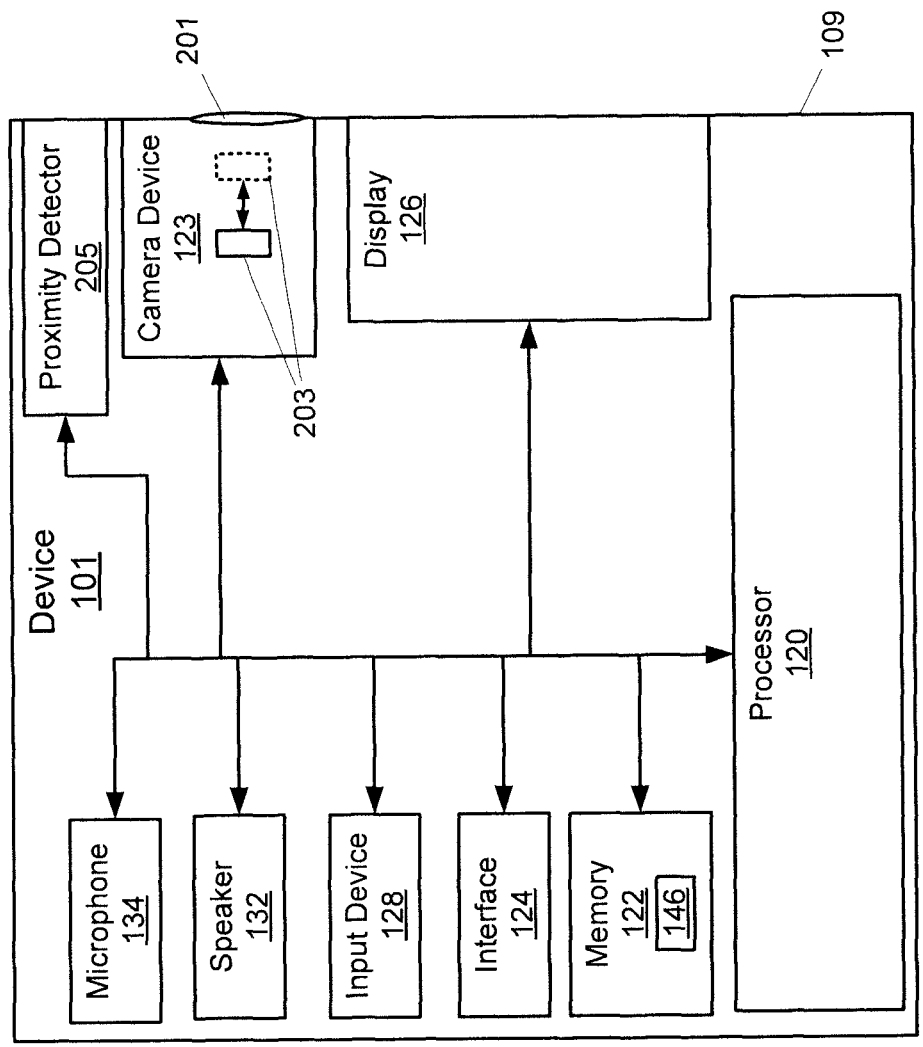
FIG. 2 depicts a schematic block diagram of the device of FIG. 1, according to non-limiting implementations.

Attention is next directed to FIG. 1 and FIG. 2 which respectively depict a front perspective view and a schematic diagram of a mobile electronic device 101 (referred to interchangeably hereafter as device 101), according to non-limiting implementations. Device 101 comprises: a chassis 109 comprising a front side and a back side (the front side is depicted in FIG. 1); a display device 126 located on the front side of chassis 109; a camera device 123 at least partially located on the front side of chassis 109, adjacent display device 126, camera device 123 facing in a same direction as display device 126, camera device 123 configured to: acquire video in a video mode; acquire an image in a camera mode, camera device 123 being in one of the video mode or the camera mode at any given time; and, discretely step between a first focus position and a second focus position, the first focus position comprising a depth of field ("DOF") at a hyperfocal distance and the second focus position comprising a DOF in a range of about 20 cm to about 1 meter; and, a processor 120 configured to: when camera device 123 is in the camera mode, automatically control camera device 123 to the first focus position; and, when camera device 123 is in the video mode, automatically control camera device 123 to the second focus position. While only front side is depicted in FIG. 1, it is assumed that a back side of chassis 109 is present, and can be configured for being held by human hand.

Device 101 can be any type of electronic device that can be used in a self-contained manner to acquire video and images using camera device 123 and/or communicate with one or more communication networks. Device 101 can include, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances, mobile camera devices and the like. Other suitable devices are within the scope of present implementations. For example, device 101 need not comprise a mobile communication device, but rather can comprise a device with specialized functions, for example a camera device.

It should be emphasized that the shape and structure of device 101 in FIGS. 1 and 2 are purely examples, and contemplate a device that can be used for both wireless voice (e.g. telephony) and wireless data communications (e.g. email, web browsing, text, and the like). However, FIG. 1 contemplates a device that can be used for any suitable specialized functions, including, but not limited to, one or more of, telephony, computing, camera, appliance, and/or entertainment related functions.

With reference to FIGS. 1 and 2, device 101 comprises at least one input device 128 generally configured to receive input data, and can comprise any suitable combination of input devices, including but not limited to a keyboard, a keypad, a pointing device (as depicted in FIG. 1), a mouse, a track wheel, a trackball, a touchpad, a touch screen (e.g. integrated with display device 126), and the like. Other suitable input devices are within the scope of present implementations.

Input from input device 128 is received at processor 120 (which can be implemented as a plurality of processors, including but not limited to one or more central processors ("CPUs")). Processor 120 can further comprise one or more hardware processors and/or digital signal processors ("DSP"). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

Memory 122 further stores an application 146 that, when processed by processor 120, enables processor 120 to: when camera device 123 is in the camera mode, automatically control camera device 123 to the first focus position; and, when camera device 123 is in the video mode, automatically control camera device 123 to the second focus position.

Furthermore, memory 122 storing application 146 is an example of a computer program product, comprising a non-transitory computer usable medium having a computer readable program code adapted to be executed to implement a method, for example a method stored in application 146.

Camera device 123 comprises a front facing camera device, in that a front lens 201 and/or aperture of camera device 123 faces in a same direction as display device 126 as depicted in both FIGS. 1 and 2. Indeed, in FIG. 1, while camera device 123 is only generally indicated, it is apparent that at least an external component and/or an aperture and/or lens 201 of camera device 123 is adjacent display device 126 and facing forward, and/or is located on a front side of chassis 109 and/or is facing in a same direction as display device 126.

As depicted in FIG. 2, camera device 123 further comprises apparatus 203 which can move discretely between a first focus position and a second focus position, with one of the focus positions depicted in solid lines in FIG. 2 and the other of the focus positions depicted in stippled lines in FIG. 2. Apparatus 203 can comprise one or more of an aperture device, a voice coil motor, and the like configured to control a DOF of camera device 123; specifically, when apparatus 203 is in a first focus position, the DOF of camera device 123 comprises a hyperfocal distance and in the second focus position, the DOF of camera device 123 is in a range of about 20 cm to about 1 meter. In particular non-limiting implementations, a focal length of camera device 123 can be fixed, and the DOF controlled by controlling an aperture device and the like. Furthermore, while FIG. 2 implies that the two focus positions are located linearly from one another, in other implementations, movement and/or stepping between the two positions can be rotational and/or in any other direction which results in the DOF being changed from between a hyperfocal distance and in a range of about 20 cm to about 1 meter.

In particular, each of the first focus position and the second focus position are discrete focus positions of camera device 123. Specifically, apparatus 203 steps between the two focus positions without stopping at positions in between. Hence, camera device 123 is not an auto-focus camera with its attendant calibration issues, nor a fixed focus camera with its attendant limited DOF range, but rather a camera device with discrete focus positions (i.e. there are no further focus positions of the camera device other than the first focus position and the second focus position).

In particular, the first focus position, with a hyperfocal distance DOF, can be used for self-portraits (i.e. selfies), while the second focus position, with a DOF in a range of about 20 cm to about 1 meter, can be used for video chatting.

At the first focus position, a face of a user in the field of view of camera device 123 will be in focus, as well as features behind the user; hence, any images acquired at the first focus position will be suitable for showing both a user and the background, which is generally a goal in selfies. In other words, the hyperfocal distance is a distance beyond which all objects can be brought into an "acceptable" focus. In particular, the hyperfocal distance can be the closest distance at which a lens can be focused while keeping objects at infinity acceptably sharp; a lens is focused at this distance (e.g. lens 201), all objects at distances from half of the hyperfocal distance out to infinity will be acceptably sharp. Put another way, the hyperfocal distance is the distance beyond which all objects are acceptably sharp, for a lens focused at infinity. Hence, the hyperfocal distance at the first focus position can comprise a DOF in which objects at infinity are generally in focus (e.g. meet a threshold focus condition); for example, at the hyperfocal distance, the DOF of camera device 123 can be at infinity and/or set to a predetermined DOF in which objects located at infinity are sharp, which can be determined using thresholds. For example, the hyperfocal distance can be entirely dependent upon what level of sharpness is considered to be "acceptable". In some implementations, criterion for the desired acceptable sharpness can be specified through a circle of confusion (CoC) diameter limit defined as a largest acceptable spot size diameter that an infinitesimal point is allowed to spread out to on the imaging medium (film, digital sensor, etc.).

At the second focus position, a face of a user in the field of view of camera device 123 will be in focus, but features behind the user will not be in focus; hence, any video acquired at the second focus position will be suitable for showing a user, but the background will not be in focus, which is generally a goal in video chatting. As it is assumed that a user will be holding device 101 away from his/her face using his arm, the DOF of the second focus position is selected to be within an arm length, i.e. between about 20 cm and about 1 meter. In the lower end of the selected range, it is assumed that users will bend their arms when looking into camera device 123.

Put another way, the video mode of camera device 123 can correspond to a video chat mode and the camera mode of camera device 123 can correspond to a selfie mode.

Indeed, in some implementations, camera device 123 is configured to step only between the first focus position and the second focus position, without stopping at positions in-between. Indeed, in these implementations, camera device 123 cannot stop at positions between the first focus position and the second focus position as the first focus position and the second focus position are discrete positions and not continuous positions, as would be used in an auto-focus camera device.

In other words, apparatus 203 of camera device 123 is configured to step to predetermined discrete physical positions (corresponding to the two focus positions) without stopping in between. Hence, camera device 123 is configured to acquire images and/or video using two sets of discrete optical conditions: a first set of optical conditions defined by the first focus position and a second set of optical conditions defined by the second focus position. Indeed, while configuring and/or manufacturing camera device 123 in such a manner is more expensive than manufacturing a fixed focus camera device, it is less expensive than manufacturing an auto-focus camera device.

However, in yet further implementations, camera device 123 can be configured to discretely step between the first focus position, the second focus position and a third focus position, for example between the first focus position and the second focus position (e.g. between 1 meter and the hyperfocal distance), less than the second focus position (i.e. having a DOF of less than about 20 cm). Hence, in these implementations, camera device 123 can acquire images and/or video at three discrete DOFs.

Furthermore, camera device 123 is configured to: acquire video in a video mode; and acquire an image in a camera mode, camera device 123 being in one of the video mode or the camera mode at any given time. While video can be acquired in the camera mode, such video is not stored but is rendered at display device 126 in near real-time to assist a user with positioning their face in a frame in order to acquire (i.e. store) an image in memory 122. For example, while not depicted, camera device 123 generally comprises a sensor, including but not limited to CCD (charge-coupled device), which can acquire (i.e. store in memory 122) one image at a time in a camera mode (though the sensor in the camera mode can also acquire images in bursts), or a video stream in a video mode.

In general, camera device 123 operates either in the camera mode or in the video mode, for example under control of processor 120 and/or when input data is received at input device 128 to control a mode of camera device 123. For example, while not depicted, processor 120 can control display device 126 to render selectable options (e.g. in a graphic user interface (GUI), a pull-down menu), for selecting whether to use camera device 123 in a camera mode or a video mode; in other words, a user can select whether to use camera device 123 in camera mode or a video mode by selecting a corresponding selectable option from the GUI.

Alternatively, and as depicted, device 101 can comprise a proximity detector 205 configured to determine a distance between device 101 and a face in a field of view of camera device 123. Proximity detector 205 can include, but is not limited to, a time-of-flight detector. In these implementations, processor 120 can process images and/or video acquired using camera device 123, determine whether the images and/or video includes a face (e.g. using a face detection algorithm which can be included in application 146) and, when the images and/or video includes a face, processor 120 can query proximity detector 205 to determine a distance of an object to device 101, which is assumed to be the face.

When the distance from the proximity detector 205 meets given respective threshold conditions, which can be stored at memory 122, for example in application 146, processor 120 can control camera device 123 to be in a camera mode or a video mode. For example, when the distance of the detected object to device 101 is less than about 20 cm, processor 120 can control camera device 123 to be in a video mode; and when the distance of the detected object to device 101 is greater than about 20 cm, processor 120 can control camera device 123 to be in a camera mode. However, other threshold conditions are within the scope of present implementations. Regardless, camera device 123 is changed accordingly to a corresponding DOF mode depending on which given respective threshold condition is met.

Hence, a focus position of camera device can be controlled by processor 120 based on a number of factors though, generally, processor 120 automatically controls the camera device to the first focus position when camera device 123 is in the camera mode; and, automatically control the camera device to the second focus position when camera device 123 is in the video mode.

Processor 120 can be further configured to communicate with display 126, which comprises any suitable one of, or combination of, flat panel displays (e.g. LCD (liquid crystal display), plasma displays, OLED (organic light emitting diode) displays, capacitive or resistive touchscreens, CRTs (cathode ray tubes) and the like).

As depicted, device 101 further comprises an optional speaker 132 and an optional microphone 134. Speaker 132 comprises any suitable speaker for converting audio data to sound to provide one or more of audible alerts, audible communications from remote communication devices, and the like. Microphone 134 comprises any suitable microphone for receiving sound and converting to audio data. Speaker 132 and microphone 134 can be used in combination to implement telephone functions at device 101.

In some implementations, input device 128 and display 126 are external to device 101, with processor 120 in communication with each of input device 128 and display 126 via a suitable connection and/or link.

As depicted, processor 120 also connects to optional communication interface 124 (interchangeably referred to as interface 124), which can be implemented as one or more radios and/or connectors and/or network adaptors, configured to wirelessly communicate with one or more communication networks (not depicted). It will be appreciated that interface 124 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WLAN (wireless local area network) links, WiFi links, WiMax links, packet based links; the Internet, analog networks, the PSTN (public switched telephone network), access points, and the like, and/or a combination.

While not depicted, device 101 further comprises a power supply, including, but not limited to, a battery, a power pack and the like, and/or a connection to a mains power supply and/or a power adaptor (e.g. an AC-to-DC (alternating current to direct current) adaptor). In general the power supply powers components of device 101.

Further, it should be understood that in general a wide variety of configurations for device 101 are contemplated. For example, while not depicted, device 101 can further comprise a back facing camera at least partially located on a back side of chassis 109, and configured for acquiring images and/or video in a direction opposite camera device 123.

Figure 3:
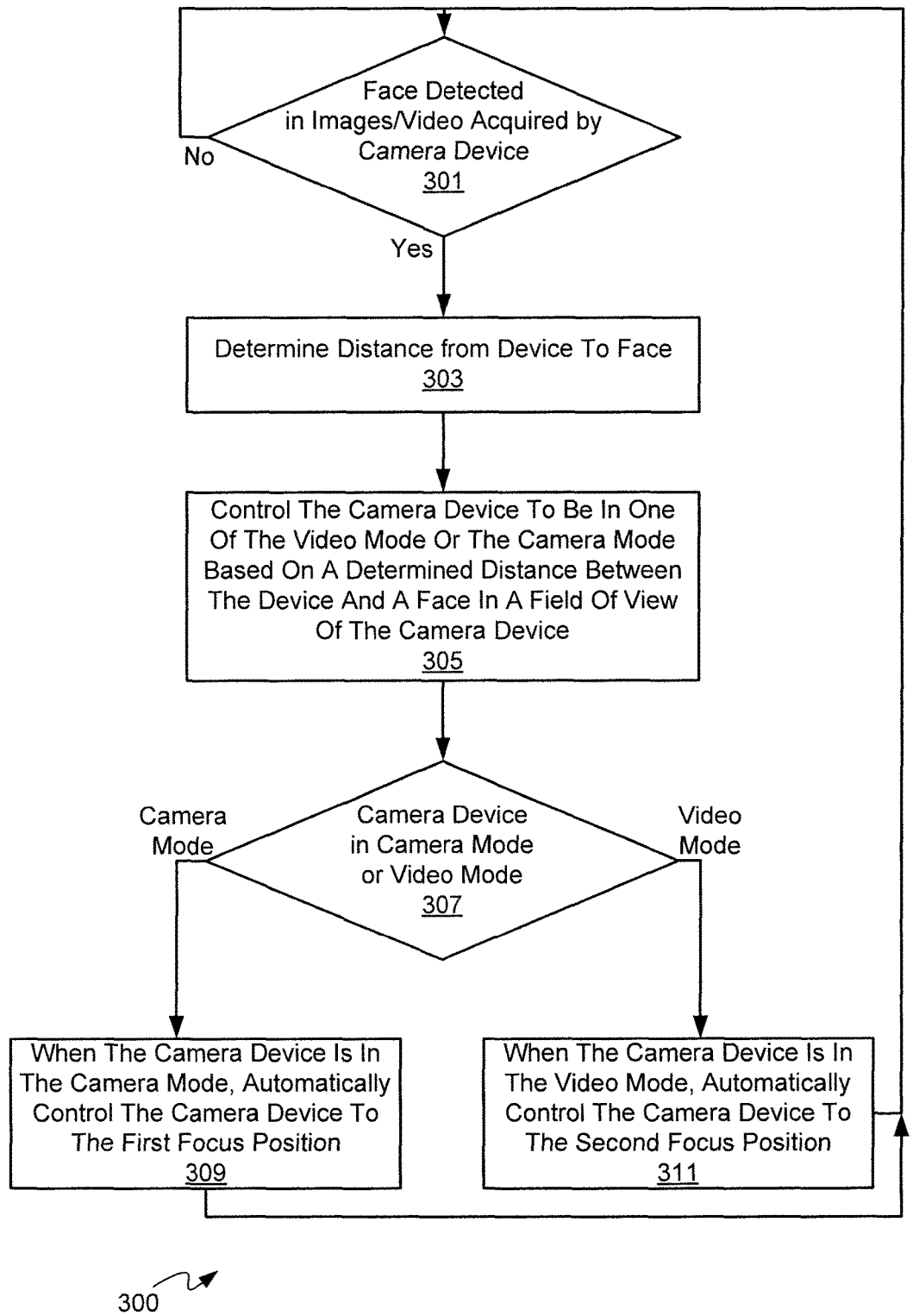
FIG. 3 depicts a block diagram of a flowchart of a method for changing between focus positions in a front facing camera of the device of FIGS. 1 and 2, according to non-limiting implementations.

Attention is now directed to FIG. 3 which depicts a block diagram of a flowchart of a method 300 of controlling a camera device between discrete focus positions, according to non-limiting implementations. In order to assist in the explanation of method 300, it will be assumed that method 300 is performed using device 101, and specifically by processor 120, for example when processor 120 processes application 146. Indeed, method 300 is one way in which device 101 can be configured. Furthermore, the following discussion of method 300 will lead to a further understanding of device 101, and its various components. However, it is to be understood that device 101 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of device 101 as well.

It is further appreciated that blocks 301 to 307 are optional.

At optional block 301, processor 120 can determine whether a face is detected in images and/or video acquired by camera device 123. Block 301 can repeat when no face is detected (i.e. a "No" decision at block 301); in other words, block 301 can repeat until a face is detected. Faces can be detected by processor 120 processing images and/or video, acquired by camera device 123, in conjunction with a face detection algorithm.

At optional block 303, which is implemented when a face is detected (i.e. a "Yes" decision at block 301), processor 120 can determine a distance from device 101 to the detected face, for example using proximity detector 205.

At optional block 305, processor 120 can control camera device 123 to be in one of the video mode or the camera mode based on the determined distance between the device and the face, which is appreciated to be located in the field of view of camera device 123, for example based on respective threshold distances as described above.

At optional block 307, processor 120 can determine whether camera device 123 is in the camera mode or the video mode, for example when processor 120 has not already determined such.

At block 309, when camera device 123 is in the camera mode (e.g. at block 307, processor 120 determines that camera device 123 is in the camera mode and/or processor 120 has previously controlled camera device 123 to the camera mode), processor 120 automatically controls camera device 123 to the first focus position.

Alternatively, at block 311, when camera device 123 is in the video mode (e.g. at block 307, processor 120 determines that camera device 123 is in the video mode and/or processor 120 has previously controlled camera device 123 to the video mode), processor 120 automatically controls camera device 123 to the second focus position.

Method 300 is now described with reference to FIGS. 4 to 10, with FIGS. 4, 5 and 7 being substantially similar to FIG. 2 with like elements having like numbers, unless otherwise noted, and FIGS. 6, 8, 9 and 10 being substantially similar to FIG. 2 with like elements having like numbers.

Figure 4:
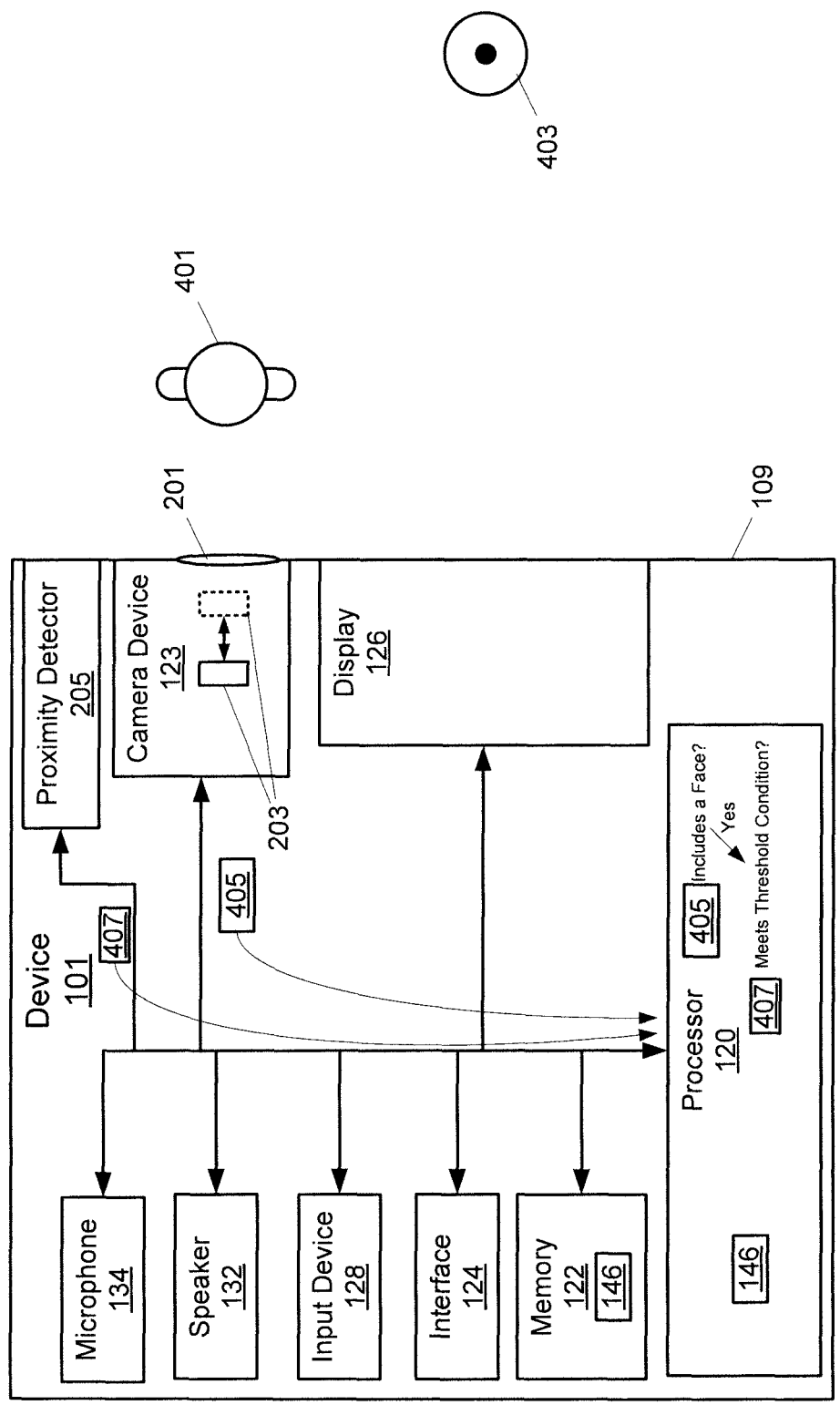
FIG. 4 depicts the device of FIG. 2 with a user and feature in a field of view of the front facing camera, according to non-limiting implementations.

Attention is next directed to FIG. 4, which schematically depicts a user 401 and a feature 403 (e.g. a tree) in a field of view of camera device 123. Apparatus 203 can be in an arbitrary one of the first focus position and the second focus position, for example a last focus position and/or a rest focus position and/or a default focus position (which can be either of the first focus position and the second focus position). It is further assumed in FIG. 4 that processor 120 is processing application 146, which can include a general camera application, in addition to the functionality described above.

In any event, a face of user 401 is appreciated to be in a field of view of camera device 123, while feature 403 is appreciated to be located behind user 401, and also visible in the field of view of camera device 123, for example over a shoulder of user 401.

In FIG. 4, processor 120 can acquire an image 405 (and/or video) of user 401 and feature 403 using current settings of camera device 123 and/or default settings of camera device 123.

As also depicted in FIG. 4, processor 120 processes image 405 to determine whether a face is present in image 405 (e.g. block 301 of method 300), for example using a face detection algorithm, which can be part of application 146.

When image 405 includes a face (assumed in FIG. 4), processor 120 can query proximity detector 205 to return a distance 407 between device 101 and user 401 (e.g. block 303 of method 300). Processor 120 can process distance 407 to determine whether distance 407 meets given threshold conditions stored in memory 122, for example in application 146, the given respective threshold conditions associated with controlling camera device 123 to one of camera mode or video mode, as described above.

Assuming that a respective threshold condition is met, processor 120 controls camera device 123 to control camera device 123 to be in one of the video mode or the camera mode based on determined distance 407 between device 101 and the face in the field of view of camera device 123 (e.g. block 305 of method 300), as described hereafter.

Figure 5:
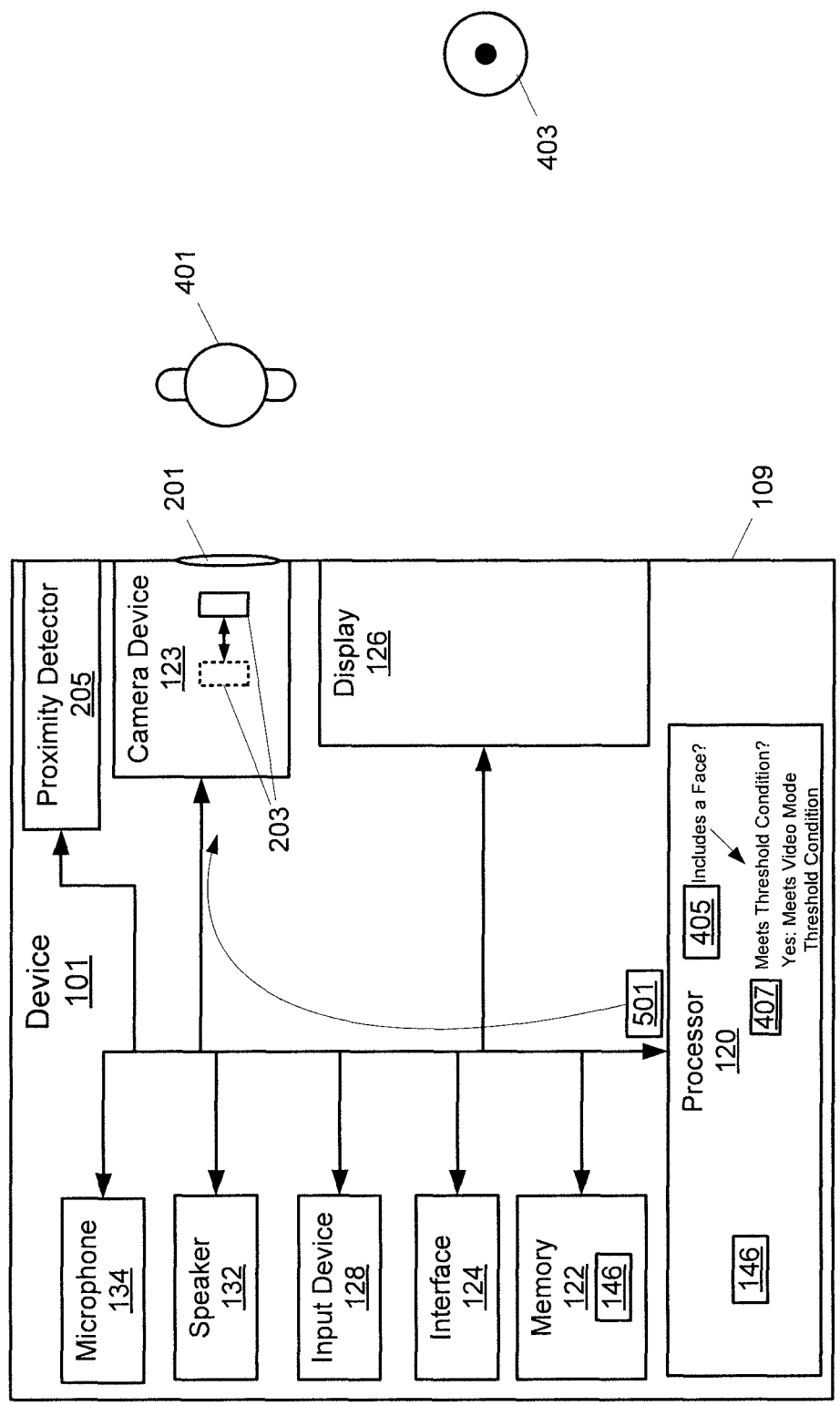
FIG. 5 depicts a processor of the device of FIG. 2 changing a depth of field position of the front facing camera to between 20 cm and 1 meter, at least based on the camera device being in a video mode, according to non-limiting implementations.

Attention is next directed to FIG. 5, where it is assumed that at block 307, processor 120 has determined that camera device 123 is in video mode, and hence processor 120 automatically controls camera device 123 to the second focus position. For example, assuming that a focus position of camera device 123 in FIG. 4 is the first focus position, and assuming that processor 120 determines at block 307 that camera device 123 is in video mode, in FIG. 5 processor 120 controls camera device 123 (for example by transmitting a command 501 thereto) which causes apparatus 203 to move to the position corresponding to the second focus position (e.g. block 311 of method 300), where the DOF of camera device 123 is in a range of about 20 cm to about 1 meter. In other words, in video mode, the DOF of camera device 123 is automatically controlled to values which are associated with video chatting, for example in a range of about 20 cm to about 1 meter.

Figure 6:
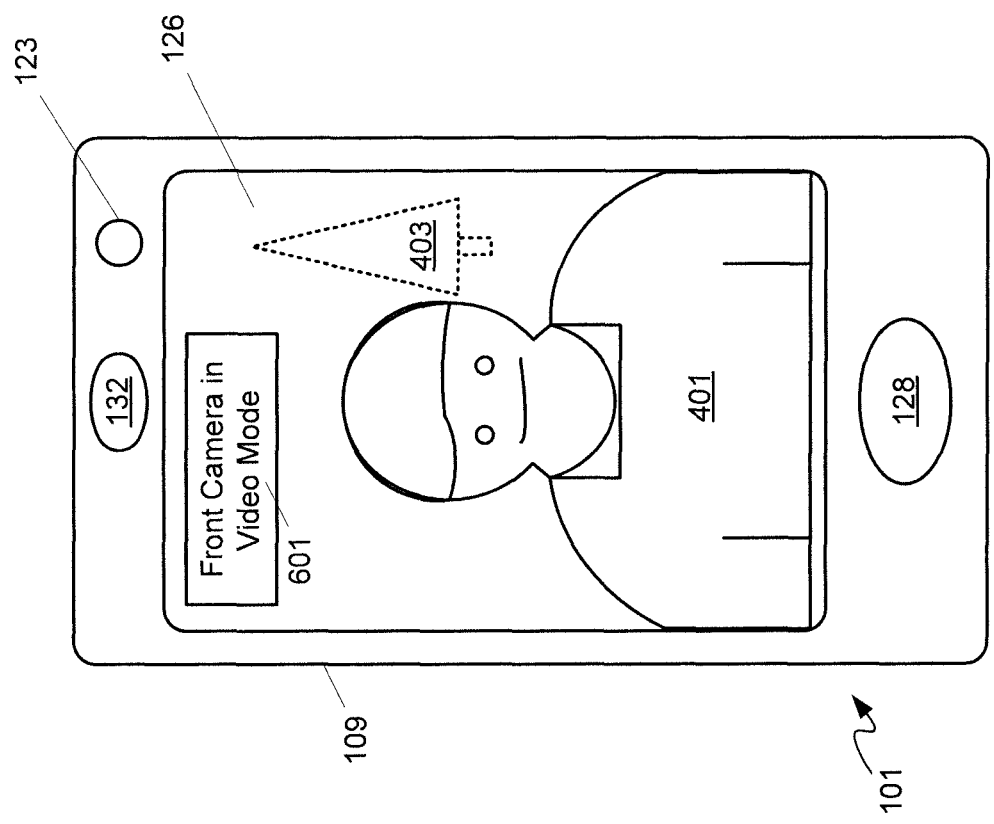
FIG. 6 depicts video acquired with a DOF between 20 cm and 1 meter in a video mode, according to non-limiting implementations.

The resulting images and/or video are depicted in FIG. 6, which depicts video rendered at display device 126, where a face of user 401 is in focus and feature 403 is out of focus (as indicated by feature 403 being drawn in stippled lines). As depicted, the video rendered at display device 126 includes an optional indicator 601 indicating that camera device 123 is in a video mode, for example for video chatting.

Figure 7:
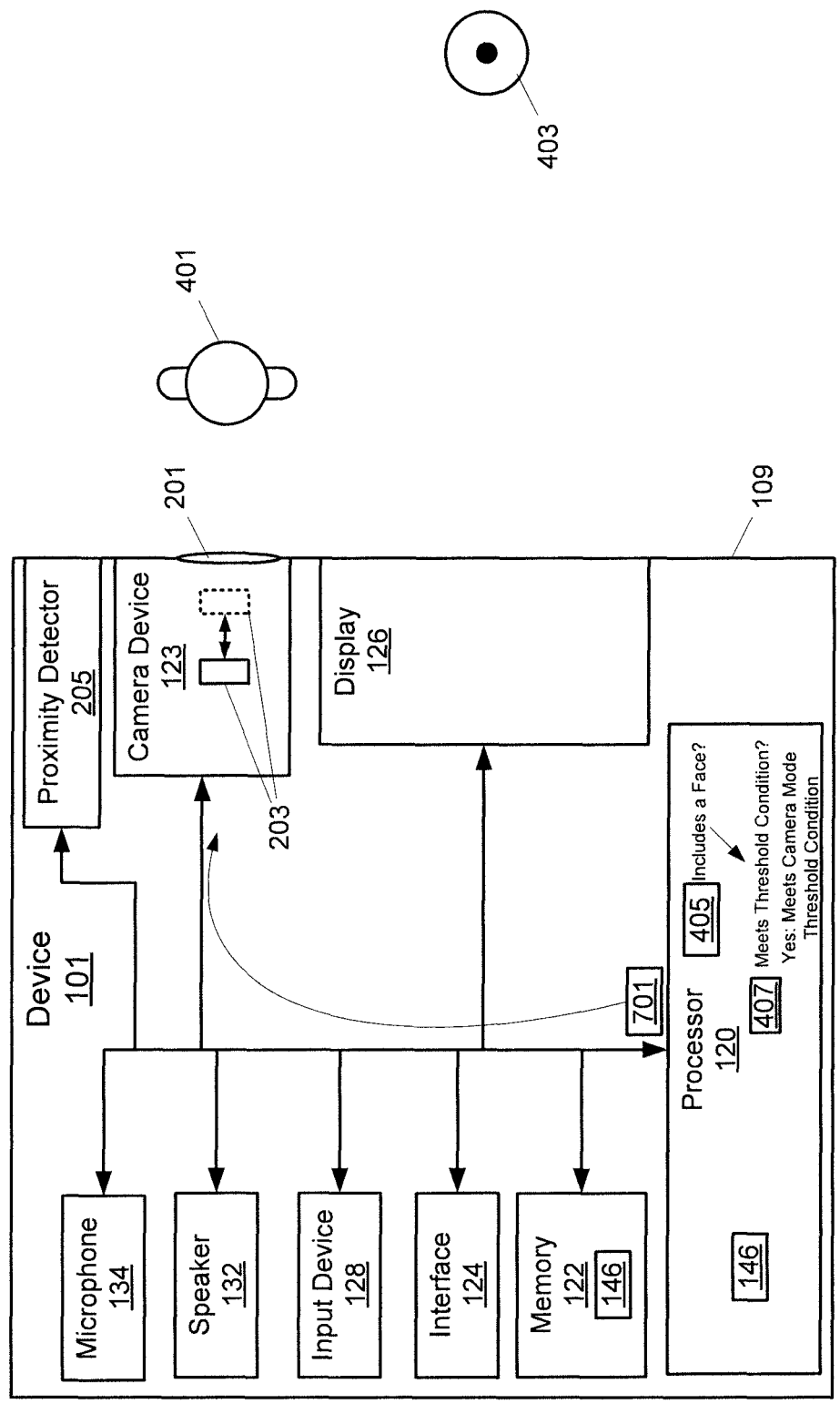
FIG. 7 depicts a processor of the device of FIG. 2 changing a depth of field position of the front facing camera to a hyperfocal distance, at least based on the camera device being in a camera mode, according to non-limiting implementations.

Attention is next directed to FIG. 7, where it is assumed that at block 307, processor 120 has determined that camera device 123 is in camera mode, and hence processor 120 automatically controls camera device 123 to the first focus position. For example, assuming that a focus position of camera device 123 in FIG. 4 is the first focus position, and assuming that processor 120 determines at block 307 that camera device 123 is in video mode, in FIG. 5 processor 120 controls camera device 123 (for example by transmitting a command 701 thereto) which causes apparatus 203 to move to the position corresponding to the second focus position (e.g. block 311 of method 300), where the DOF of camera device 123 is at the hyperfocal distance. In implementations where camera device 123 is already in the first focus position, command 701 is optional. In other words, in camera mode, the DOF of camera device 123 is automatically controlled to values which are associated with acquiring self-portraits and/or selfies, for the hyperfocal distance.

Figure 8:
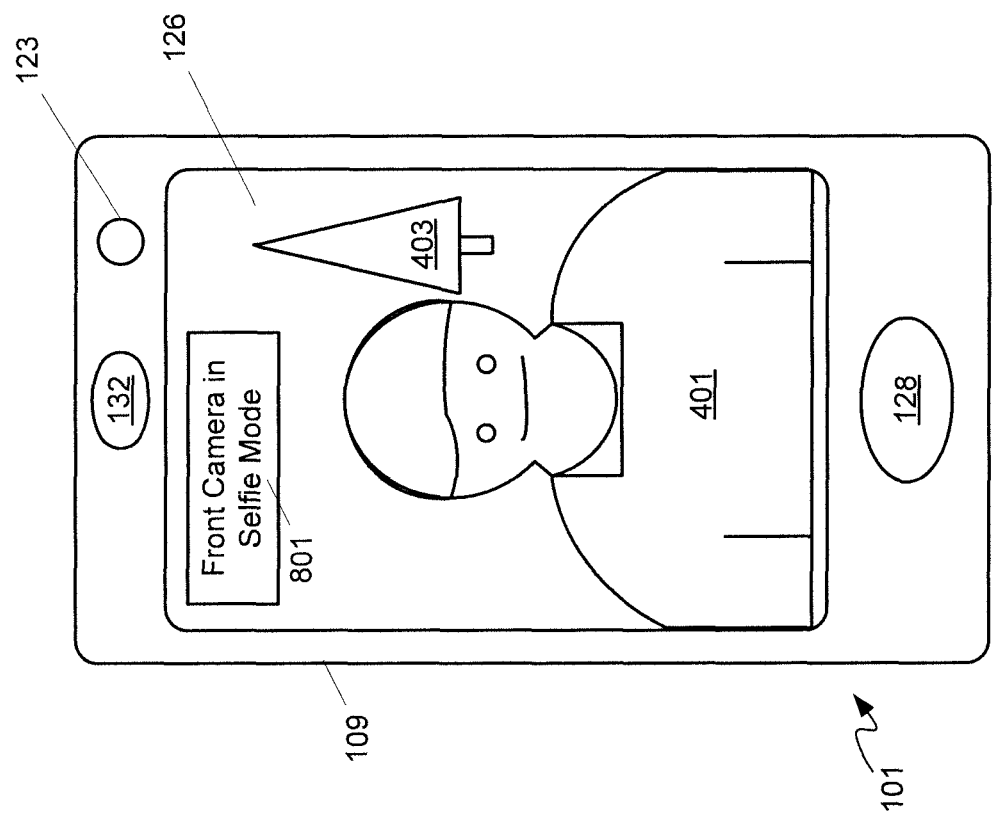
FIG. 8 depicts an image acquired with a DOF at a hyperfocal distance in a camera mode, according to non-limiting implementations.

A resulting image is depicted in FIG. 8, which depicts an image rendered at display device 126, where a face of user 401 is in focus and feature 403 is also in focus (as indicated by feature 403 being drawn in solid lines). As depicted, the image rendered at display device 126 includes an optional indicator 801 indicating that camera device 123 is in a camera mode and/or selfie mode, for example for acquiring self-portraits that include features behind user 401.

As described above, camera device 123 comprises two discrete focus positions, a first focus position where the DOF is at the hyperfocal distance, and a second focus position where the DOF is in a range of about 20 cm to about 1 meter. When camera device 123 is in camera mode, processor 120 controls camera device 123 to the first focus position, so that selfies can be taken, and when camera device 123 is in video mode, processor 120 controls camera device 123 to the second focus position for video chatting. However, in some implementations, input device 128 can be used to change between focus positions regardless of a mode of camera device 123. In such implementations, processor 120 is further configured to: control camera device 123 to the first focus position or the second focus position based on input data received at input device 128.

Figure 9:
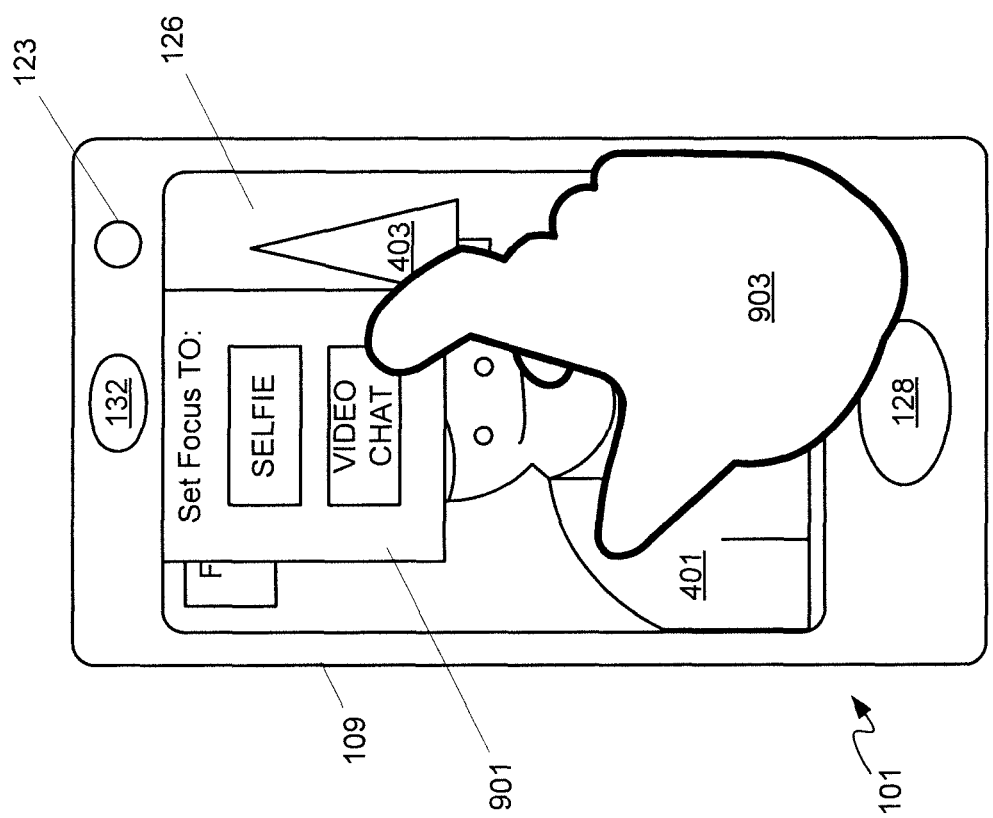
FIG. 9 depicts selectable options for changing between focus positions of the camera device, according to non-limiting implementations.

For example, attention is next directed to FIG. 9 which is similar to FIG. 8, with like elements having like numbers. Hence, in FIG. 9, camera device 123 has been controlled to a camera mode, and to the first focus position so that the DOF is at the hyperfocal distance. However, FIG. 9 further depicts a pull-down menu 901 comprising selectable options "Selfie" and "Video Chat" corresponding, respectively, to the first focus position and the second focus position. FIG. 9 also depicts a hand 903 of user 401 selecting option "Video Chat" in order to change a focus position of camera device 123 from the first position to the second position, assuming that input device 128 includes a touchscreen of display device 126. However, other formats for presenting and/or selecting selectable options for changing focus positions, other than pull-down menus, are within the scope of present implementations.

FIG. 10 depicts device 101 after selectable option "Video Chat" has been selected while camera device 123 is in camera mode. Specifically, camera device 123 changes to second focus position so that the DOF is in a range of 20 cm to 1 meter, while camera device 123 remains in camera mode, such that a face of user 401 is in focus but feature 403 is out of focus, as in FIG. 6 (where camera device 123 is in video mode). Optional indicator 801 changes to optional indicator 1001 which indicates that camera device 123 is in camera mode but with a "Short" DOF; alternatively, a numerical value of the DOF could be provided and/or another subjective indicator which indicates that camera device 123 is in the second focus position. While not depicted, when camera device 123 is in video mode, menu 901 can be used to change camera device 123 from the second focus position to the first focus position, so that video can be acquired by camera device 123 with a DOF at the hyperfocal distance.

In any event, provided herein is a device that includes a front facing camera device that can be changed between two discrete focus positions, which are optimized for use with a video mode and a camera mode, and specifically optimized for video chatting and selfie acquisitions. The device can automatically adjust the front facing camera device between the two discrete focus positions based on whether the front facing camera device is in a video mode or a camera mode, using an underlying assumption that in video mode, the front facing camera device is to be used for video chatting, and in camera mode the front facing camera device is to be used for acquiring selfies. In general, the DOF for the discrete focus position for selfies is a hyperfocal distance, and the DOF for the discrete focus position for selfies is in a range of about 20 cm to about 1 meter. While in some implementations, there are only two discrete focus positions, in other implementations there can be three discrete focus positions, though the DOF for the discrete focus position for selfies is a hyperfocal distance is neither an auto-focus camera device nor a fixed focus camera device.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not depicted) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a chassis comprising a front side and a back side;
a display device located on the front side of the chassis;
a camera device at least partially located on the front side of the chassis adjacent the display device, the camera device facing in a same direction as the display device, the camera device configured to: acquire video in a video mode; acquire an image in a camera mode, the camera device being in one of the video mode or the camera mode at any given time; and, discretely step between a first focus position and a second focus position, the first focus position comprising a depth of field ("DOF") at a hyperfocal distance and the second focus position comprising a DOF in a range of about 20 cm to about 1 meter;
a proximity detector configured to determine a distance between the device and a face in a field of view of the camera device; and,
a processor configured to:
determine, using the proximity detector, the distance between the device and the face;
when the distance is greater than about 20 cm, automatically control the camera device to the camera mode, and when the camera device is in the camera mode, automatically control the camera device to the first focus position; and,
when the distance is less than about 20 cm, automatically control the camera device to the video mode, and when the camera device is in the video mode, automatically control the camera device to the second focus position.

2. The device of claim 1, wherein each of the first focus position and the second focus position are discrete focus positions of the camera device.

3. The device of claim 1, wherein the camera device is configured to step only between the first focus position and the second focus position.

4. The device of claim 1, wherein there are no further focus positions of the camera device other than the first focus position and the second focus position.

5. The device of claim 1, wherein the camera device is configured to discretely step between the first focus position, the second focus position and a third focus position.

6. The device of claim 1, wherein the video mode corresponds to a video chat mode and the camera mode corresponds to a selfie mode.

7. The device of claim 1, further comprising an input device, the processor further configured to: control the camera device to the first focus position or the second focus position based on input data received at the input device.

8. A method comprising:
at a device comprising: a chassis comprising a front side and a back side; a display device located on the front side of the chassis; a camera device at least partially located on the front side of the chassis adjacent the display device, the camera device facing in a same direction as the display device, the camera device configured to: acquire video in a video mode; acquire an image in a camera mode, the camera device being in one of the video mode or the camera mode at any given time; and, discretely step between a first focus position and a second focus position, the first focus position comprising a depth of field ("DOF") at a hyperfocal distance and the second focus position comprising a DOF in a range of about 20 cm to about 1 meter; a proximity detector configured to determine a distance between the device and a face in a field of view of the camera device; and, a processor:
determining, using the proximity detector, the distance between the device and the face;
when the distance is greater than about 20 cm, automatically controlling the camera device to the camera mode, and when the camera device is in the camera mode, automatically controlling, using the camera device, the camera device to the first focus position; and,
when the distance is less than about 20 cm, automatically controlling the camera device to the video mode, and when the camera device is in the video mode, automatically controlling, using the camera device, the camera device to the second focus position.

9. The method of claim 8, wherein each of the first focus position and the second focus position are discrete focus positions of the camera device.

10. The method of claim 8, wherein the camera device is configured to step only between the first focus position and the second focus position.

11. The method of claim 8, wherein there are no further focus positions of the camera device other than the first focus position and the second focus position.

12. The method of claim 8, wherein the camera device is configured to discretely step between the first focus position, the second focus position and a third focus position.

13. The method of claim 8, wherein the video mode corresponds to a video chat mode and the camera mode corresponds to a selfie mode.

14. The method of claim 8, wherein the device further comprises an input device, and the method further comprises: controlling the camera device to the first focus position or the second focus position based on input data received at the input device.

15. A non-transitory computer-readable medium storing a computer program, wherein execution of the computer program is for:
at a device comprising: a chassis comprising a front side and a back side; a display device located on the front side of the chassis; a camera device at least partially located on the front side of the chassis adjacent the display device, the camera device facing in a same direction as the display device, the camera device configured to: acquire video in a video mode; acquire an image in a camera mode, the camera device being in one of the video mode or the camera mode at any given time; and, discretely step between a first focus position and a second focus position, the first focus position comprising a depth of field ("DOF") at a hyperfocal distance and the second focus position comprising a DOF in a range of about 20 cm to about 1 meter; a proximity detector configured to determine a distance between the device and a face in a field of view of the camera device; and, a processor:

determining, using the proximity detector, the distance between the device and the face;

when the distance is greater than about 20 cm, automatically controlling the camera device to the camera mode, and when the camera device is in the camera mode, automatically controlling, using the camera device, the camera device to the first focus position; and, when the distance is less than about 20 cm, automatically controlling the camera device to the video mode, and when the camera device is in the video mode, automatically controlling, using the camera device, the camera device to the second focus position.

* * * * *